No. 852,546. PATENTED MAY 7, 1907.
H. G. FERRIS.
AUTOMATIC DUMPING MECHANISM FOR AERIAL TRAMWAY BUCKETS.
APPLICATION FILED MAR. 30, 1906.
2 SHEETS—SHEET 1.
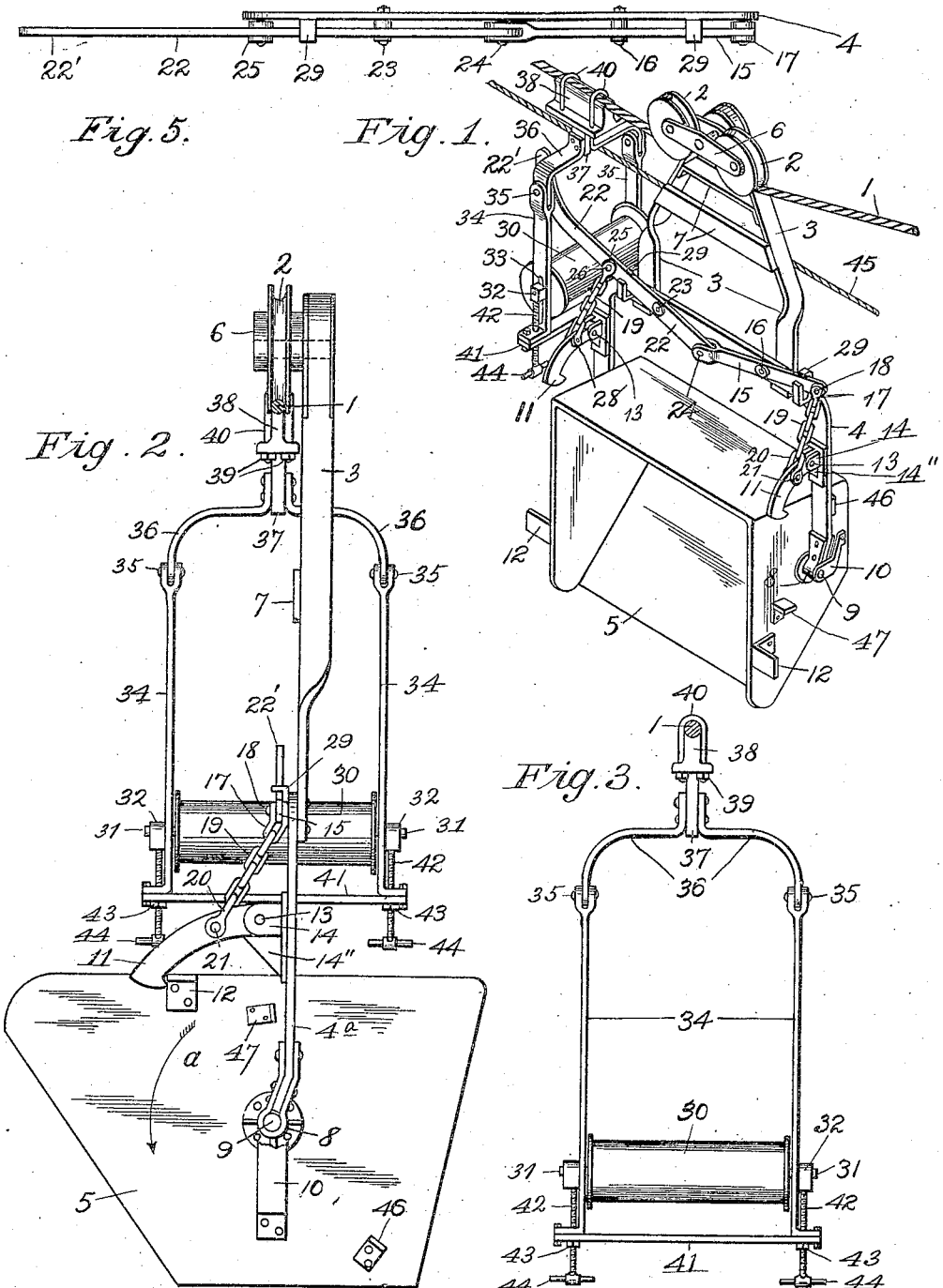
Witnesses:
Wm W. Single
J. Moore
Inventor:
Hiram G. Ferris
By F. G. Fischer
Atty.

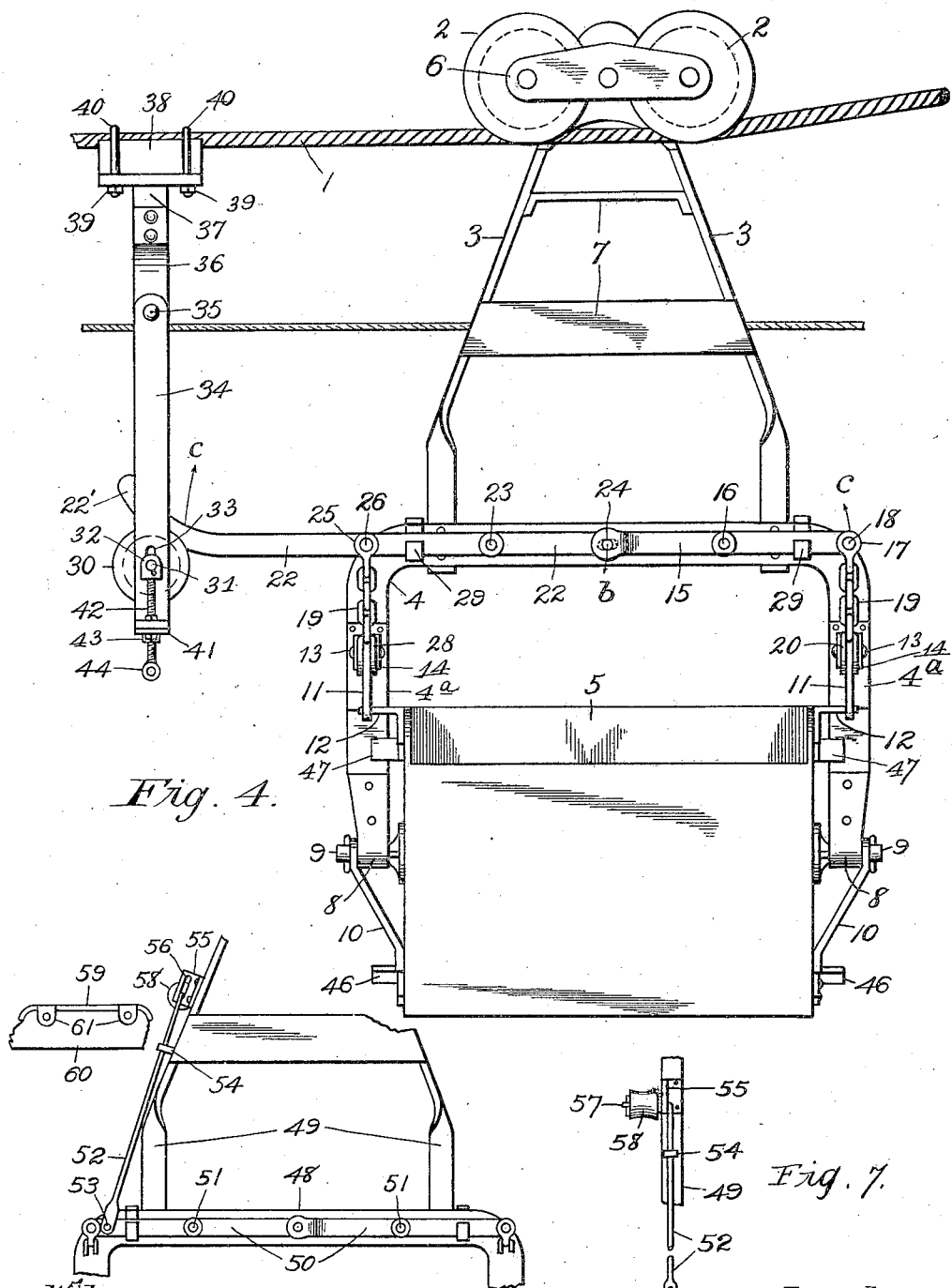

UNITED STATES PATENT OFFICE.

HIRAM G. FERRIS, OF LEAVENWORTH, KANSAS.

AUTOMATIC DUMPING MECHANISM FOR AERIAL-TRAMWAY BUCKETS.

No. 852,546.  Specification of Letters Patent.  Patented May 7, 1907.

Application filed March 30, 1906. Serial No. 308,862.

*To all whom it may concern:*

Be it known that I, HIRAM G. FERRIS, a citizen of the United States, residing at Leavenworth, in the county of Leavenworth and State of Kansas, have invented certain new and useful Improvements in Automatic Dumping Mechanism for Aerial-Tramway Buckets, of which the following is a specification.

My invention relates to automatic dumping mechanism for aerial tramway buckets, and the object of my invention is to provide an improved, reliable dumping mechanism which will be adapted either for two-bucket system tramways wherein the traction-cable alternately moves forwardly and backwardly, or for that class of tramways in which the traction cable moves continuously in one direction.

To this end my invention consists in the novel construction, and combination of parts, as herein described and claimed, and in order that it may be fully understood, reference will now be made to the accompanying drawings, in which:—

Figure 1 is a broken perspective view of an aerial tramway provided with my automatic dumping mechanism adapted for the two bucket system. Fig. 2 is an enlarged end elevation of the same, the bucket being in normal position. Fig. 3 is a front elevation of the trip-roller and its supporting means, the track-rope being in section. Fig. 4 is a side elevation of the apparatus shown in Figs. 1 and 2. Fig. 5 is a detail plan view of the bail of the bucket and the compound trip-lever mounted thereon. Fig. 6 is a side elevation of a modified trip mechanism adapted for aerial tramways, wherein the traction cable moves continuously in one direction. Fig. 7 is an edge view of the trip-roller and the rod carrying said roller.

In Figs. 1, 2, 3 and 4 1 designates the track-rope, upon which travel the sheave-wheels 2 of a hanger 3 which supports the bail 4 of a dumping bucket 5. The hanger comprises a plate 6 connecting the sheave axles, a pair of downwardly diverging arms 3, and suitable cross-bars 7. The bail 4 is of the usual form, having the two depending arms 4ª, provided at their lower ends with boxings 8, through which project the trunnions 9 of the dumping bucket 5. From the ends of the trunnions, braces 10 run downwardly and are secured to the ends of the bucket. The bucket dumps in the direction of arrow *a*, Fig. 2, when full of material and released by the trip mechanism. The bucket is normally held in upright position by means of two dogs 11, engaging lugs 12, secured to the ends of the bucket. The dogs 11 are pivoted on pins 13, held by jaws 14, rigidly secured to the bail 4.

As shown in Figs. 1 and 4, a lever 15 is fulcrumed upon a stud 16, projecting from the bail 4. A clevis 17 connected at 18 to said lever, has connected thereto a chain 19, the lower end of which is connected to a clevis 20 which is connected at 21 to one of the dogs 11. A companion lever 22, hereinafter termed the trip-lever, is fulcrumed upon a stud 23, projecting from the bail 4. The inner end of this lever is connected to the inner end of lever 15 by a pin-and-slot joint 24. From its fulcrum the trip-lever 22 extends outwardly beyond the bucket, as shown, and its terminal portion 22' is curved or inclined upwardly. From a clevis 25, connected to the trip-lever at 26 a chain 19 passes down to a clevis 28, connected to the opposite bucket-dog 11. Two guide pieces 29, secured to the bail 4, loosely engage the respective levers 15 22 for the purpose of relieving the fulcrums 16 23 of twisting strain when said levers draw up the dogs 11 and chains 19, or preventing said levers from being pulled outwardly by the oblique resistance of said chains.

At the point where the bucket is to be dumped, a trip-lever operating device is adjustably attached to the track-rope 1. My preferred form of this device is shown in Figs. 1, 2 and 4 and also, detached, in Fig. 3. It consists of an elongated trip-roller 30, having a shaft or shafts 31, journaled in boxings or blocks 32, and extending through vertical slots 33 in a pair of depending arms 34, pivotally connected by pins 35 to the ends of a yoke 36, which is secured to the downward extension 37 of a clip 38, tightly clamped upon the track-rope 1 by nuts 39 on the ends of the U-bolts 40. The lower ends of the roller-supporting arms 34 are rigidly connected by a transverse bar 41. The bearings or boxings 32 rest upon the upper ends of a pair of adjusting screws 42, passing through threaded holes in the bar 41 and the outturned ends of arms 34. Each adjusting screw 42 is provided with a jam-nut 43 and a handle 44. 45 designates the traction cable.

The bucket hanger 3 is provided with the usual grip (not shown) for positively engaging said cable 45.

The operation is as follows:—The bucket is carried along by the traction cable 45 until the trip-lever 22 impinges upon the upper surface of the roller 30 and rides over the same a short distance, when the traction cable is stopped, thereby bringing the bucket to a standstill. The trip-lever 22 being forced upwardly by its engagement with the roller 30 draws up the chain 19 connected thereto, which chain releases the dog 11 from the lug 12 at one side of the bucket, simultaneously, the inner end of the trip-lever moves down, as per arrow $b$ of Fig. 4, thereby forcing up the outer end of the companion lever 15 as per arrow $c$, which end draws up the chain and dog connected thereto. The dogs 11 being disengaged from the lugs 12, the bucket dumps, and its movement in that direction is limited by two stops 46 thereon, striking the bail 4. Relieved of its load the bucket automatically returns to normal, its upward movement being limited by stops 27 contacting with the bail.

The apparently excessive length or width of the trip roller is a feature of advantage, owing to the fact that the bucket usually swings from side to side when in motion, and hence the trip-lever 22 would in some cases fail to engage a narrow trip-roller and the bucket would not dump. The length of my rollers 30 as shown in Fig. 2 and Fig. 3, insures the operation of the trip-lever at the proper time.

By references to Fig. 2 it will be observed that the dog-holding jaws 14 are formed with extensions 14' which underlie the dogs 11 when the latter are in lowered position. The function of said extensions 14' is to form positive stops to limit the downward motion of the dogs 11 when the bucket dumps. Sometimes the traction rope 45 and the bucket will travel some inches beyond the proper point, before coming to a stop at the dumping station. If the roller 30 were rigidly suspended, the bail 4 would in such cases collide with the roller and thereby sharply bend the track-rope at the ends of the clip 38. To avoid injury to any part is my object in pivoting the roller hangers 34 on the yoke 36, as shown. If the bucket travels too far its bail 4 will strike and push the roller 30 ahead of it, the arms 34 turning on pivots 35, and the roller ascending as it swings. This upward motion of the roller also assures the full stroke of the trip-lever 22.

My modified dumping mechanism, Figs. 6 and 7, is designed for use on the endless cable system, in which the buckets travel from a loading station to a dumping station, (at which the cable passes around a sheave) and return to the loading station on the continuously-moving endless cable.

In Figs. 6 and 7, 48 is the upper portion of the bucket bail, and 49 is a portion of the hanger corresponding to hanger 3 in Fig. 4. Upon the bail 48, a pair of trip-levers 50 are fulcrumed at 51, respectively, and operate chains and dogs (not shown) as in Fig. 4. A rod 52, pivotally connected to one of the levers 50 at 53, extends upwardly through a guide 54 secured to the hanger, and its upper end is bent laterally and passes through a slot 56 in an upper guide 55, said slot being parallel to the rod 52. The portion 57 of said rod forms a spindle for a trip-roller 58 which may be slightly concave faced, as shown. Fixed upon a terminal plate 60, by lugs 61, is a trip-cam 59, consisting of a straight bar having downwardly-inclined ends, the body of the cam being set in position to engage the trip-roller 58. The rod 52 and roller 58 are normally depressed, but when the roller passes over the cam 59 it is thereby lifted, raising said rod and operating the levers 50, chains and dogs, permitting the bucket to dump. After the roller passes the cam the parts resume their normal positions.

Having thus described my invention, what I claim and desire to secure by Letters-Patent, is:—

1. In automatic dumping mechanism for aerial tramway buckets, the combination with a track, a traveling hanger, a bail, and a dumping bucket suspended therefrom; of a pair of levers fulcrumed on the bail and pivotally connected at their inner ends, dogs carried by the bail and normally holding the bucket in upright position, connecting members between said dogs and said levers, and means, operated by the onward motion of the bucket, to operate said levers and trip the dogs, thereby permitting the bucket to dump.

2. In automatic dumping mechanism for aerial tramway buckets, the combination with a track, a traveling hanger a bail and a dumping bucket, suspended therefrom; of a trip-lever and an operatively connected companion lever fulcrumed on the bail, dogs adapted to hold the bucket in upright position, and connecting members between the dogs and said levers.

3. In automatic dumping mechanism for aerial tramway buckets, the combination with a track, a traveling hanger a bail and a dumping bucket, suspended therefrom; of a compound trip-lever comprising two levers pivotally connected at their inner ends, said levers being fulcrumed on the bail, dogs adapted to hold the bucket in upright position, and connecting members between the dogs and said levers.

4. In automatic dumping mechanism for aerial tramway buckets, the combination with a track-rope, a traveling hanger, a bail and a dumping bucket, suspended therefrom; of a trip-lever and an operatively-connected companion lever fulcrumed on the bail, dogs adapted to hold the bucket in upright position, connecting members between the dogs and said levers, and a trip-roller, suspended from said track-rope and adapted to actuate the trip-lever.

5. In automatic dumping mechanism for aerial tramway buckets, the combination with a track-rope, a traveling hanger, a bail and a dumping bucket, pivotally suspended therefrom; of a trip-lever and an operatively-connected companion lever fulcrumed on the bail, dogs adapted to hold the bucket in upright position, connecting members between the dogs and said levers, and a trip-roller, suspended from said track-rope and adapted to actuate the trip-lever.

6. In automatic dumping mechanism for aerial tramway buckets, the combination with a track-rope, a traveling hanger, a bail and a dumping bucket, suspended therefrom; of a trip-lever and an operatively-connected companion lever fulcrumed on the bail, dogs adapted to hold the bucket, in upright position, connecting members between the dogs and said levers, a yoke rigidly attached to the track-rope, arms supported by said yoke, and a trip-roller supported by said arms.

7. In automatic dumping mechanism for aerial tramway buckets, the combination with a track-rope, a traveling hanger, a bail and a dumping bucket, suspended therefrom; of a trip-lever and an operatively-connected companion lever fulcrumed on the bail, dogs adapted to hold the bucket in upright position, connecting members between the dogs and said levers, and a vertically adjustable trip-roller, suspended from said track-rope and adapted to actuate the trip-lever.

8. In automatic dumping mechanism for aerial tramway buckets, the combination with a track-rope, a traveling hanger, a bail and a dumping bucket pivotally suspended therefrom; of a trip-lever and an operatively-connected companion lever fulcrumed on the bail, dogs adapted to hold the bucket in upright position, connecting members between the dogs and said levers, and a vertically adjustable trip-roller, suspended from said track-rope and adapted to actuate the trip-lever.

9. In automatic dumping mechanism for aerial tramway buckets, the combination with a track-rope, a traveling hanger, a bail and dumping bucket, suspended therefrom; of a trip-lever and an operatively-connected companion lever fulcrumed on the bail, dogs adapted to hold the bucket in upright position, connecting members between the dogs and said levers, a yoke rigidly attached to the track rope, arms supported by said yoke, and a vertically adjustable trip-roller supported by said arms.

In testimony whereof I affix my signature, in the presence of two witnesses.

HIRAM G. FERRIS.

Witnesses:
CLAUD HALL,
E. STEWART BREWSTER.